May 10, 1949.  G. E. DATH  2,469,549
SHOCK ABSORBING MECHANISM FOR DRAFT RIGGINGS
Filed Oct. 11, 1947  2 Sheets-Sheet 1

Inventor.
George E. Dath.
By Henry Fuchs.
Atty.

May 10, 1949.  G. E. DATH  2,469,549
SHOCK ABSORBING MECHANISM FOR DRAFT RIGGINGS
Filed Oct. 11, 1947  2 Sheets-Sheet 2

Inventor:
George E. Dath.
By Henry Fuchs
Atty.

Patented May 10, 1949

2,469,549

UNITED STATES PATENT OFFICE 2,469,549

SHOCK ABSORBING MECHANISM FOR DRAFT RIGGINGS

George E. Dath, Mokena, Ill., assignor to W. H. Miner, Inc., Chicago, Ill., a corporation of Delaware Application October 11, 1947, Serial No. 779,355

9 Claims. (Cl. 213—24)

1

This invention relates to improvements in combined friction and spring shock absorbing mechanisms more particularly adapted for draft riggings of railway locomotives and cars.

One object of the invention is to provide a shock absorbing mechanism of the character indicated of high capacity, having frictional resistance in draft and free spring action in buff.

A further object of the invention is to provide a shock absorbing mechanism adapted for relatively short draft rigging pockets, including a friction shock absorber comprising a friction casing, friction shoes slidingly telescoped within the casing, spring means yieldingly opposing inward movement of the shoes, a wedge block for spreading the shoes apart into tight frictional engagement with the friction surfaces of the casing and forcing the same inwardly of the casing, and a spring shock absorbing means comprising a spring cage within which the casing is arranged, additional springs within the cage, and a follower for compressing the additional springs, wherein the parts are disposed within a movable yoke which engages the wedge and follower in draft to move the same inwardly to compress both the friction shock absorber and the spring shock absorbing means, and which engages the spring cage in buff to move the same and the friction casing toward the follower which is held stationary to compress the spring shock absorbing means and the spring of the friction shock absorber and thereby provide free spring action, the wedge being movable with respect to the follower and being inactive during the buffing action, and the spring of the friction shock absorber being compressed against the friction shoes which have their movement arrested by engagement with the follower.

Other objects of the invention will more clearly appear from the description and claims hereinafter following.

Figure 1:
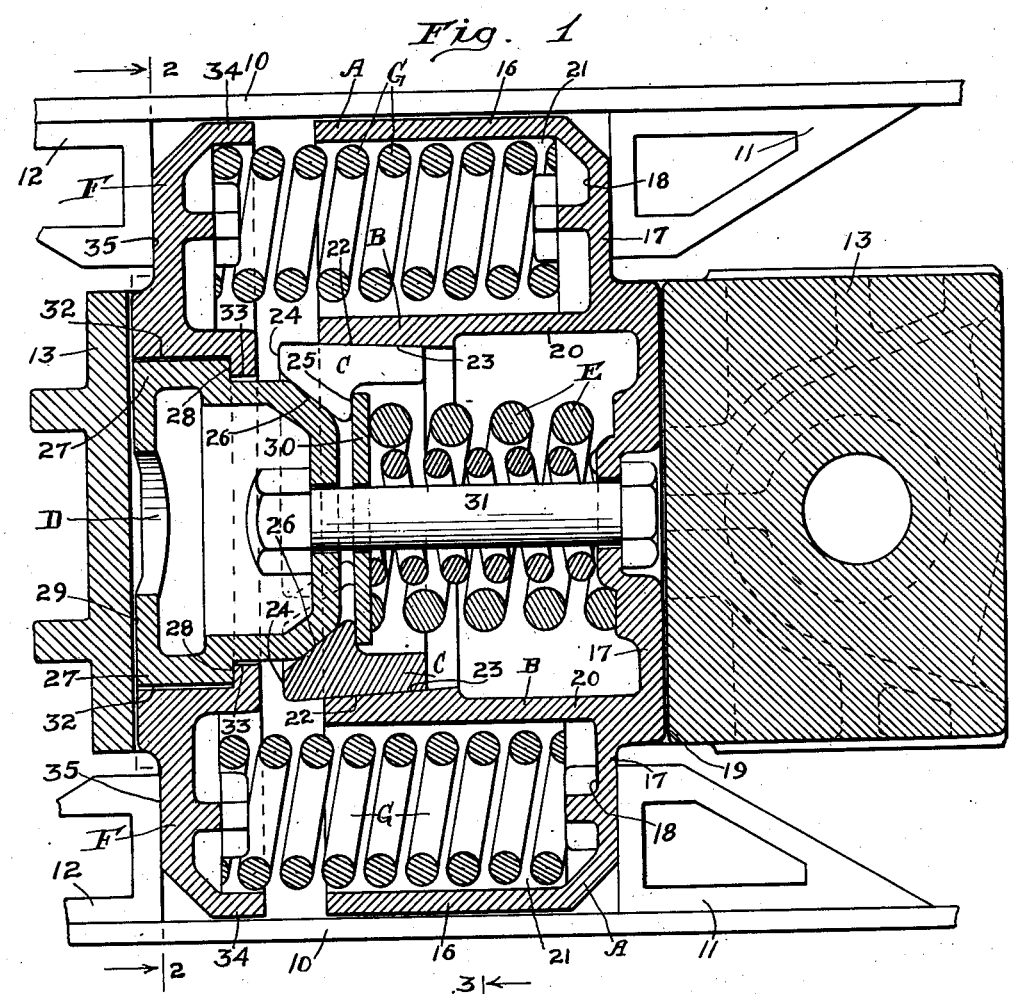
Figure 2:
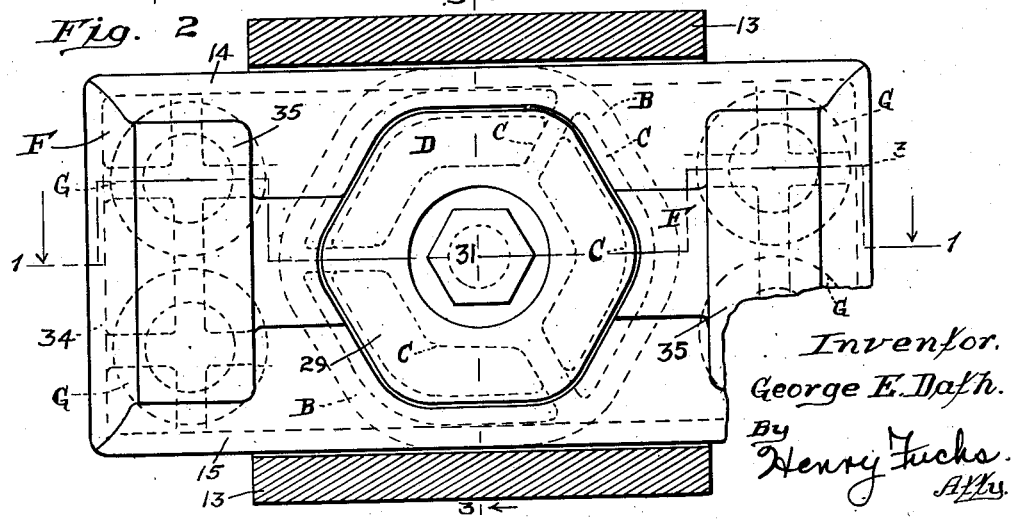
Figure 3:
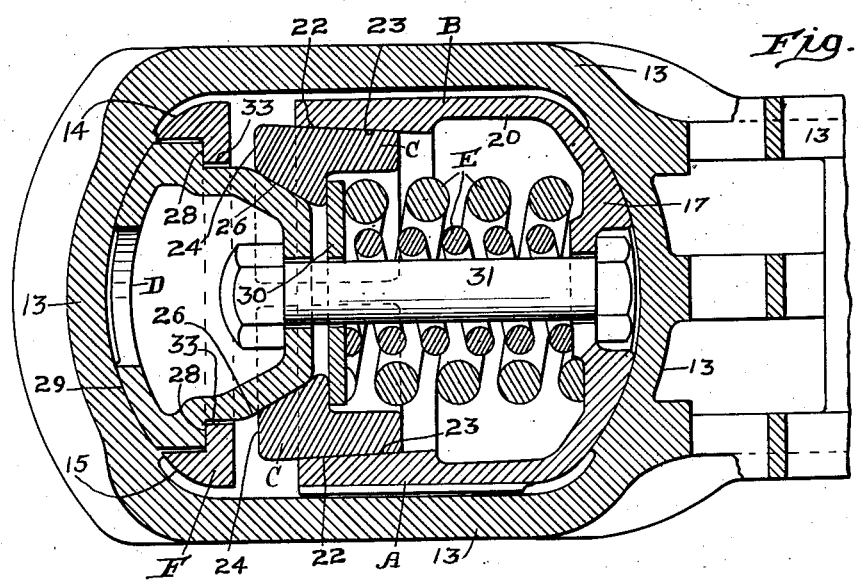
Figure 4:
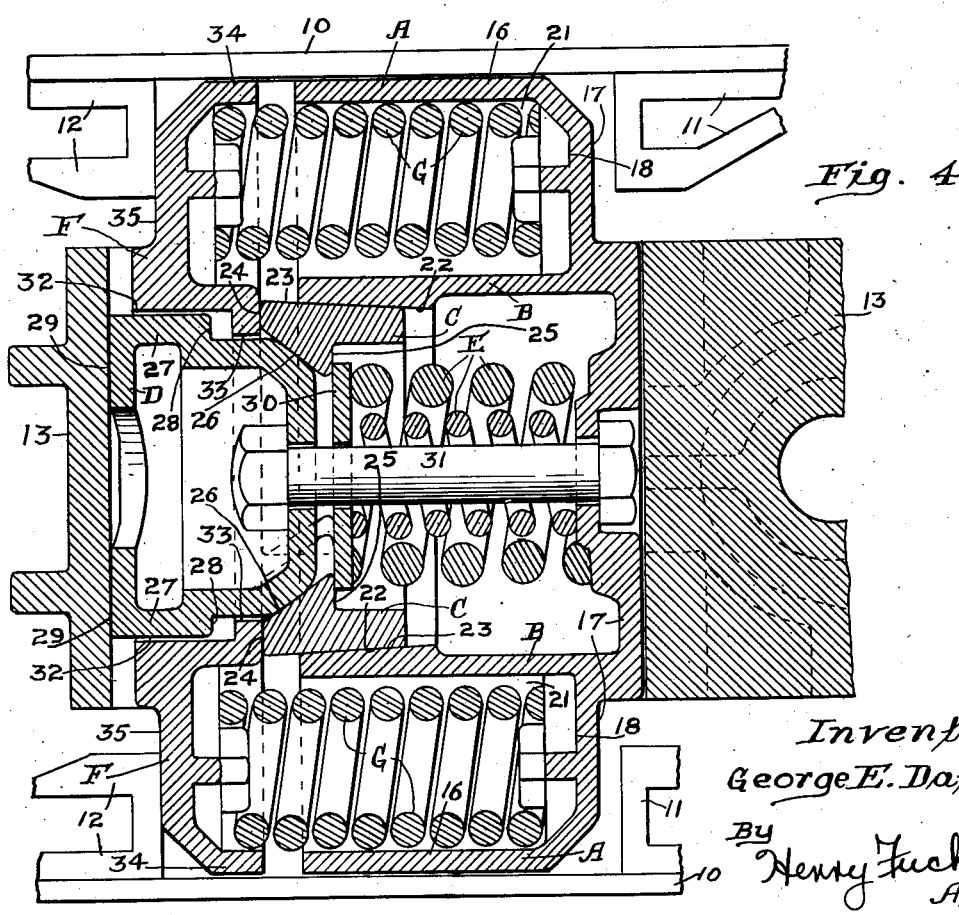

In the accompanying drawings forming a part of this specification, Figure 1 is a horizontal sectional view of my improved shock absorbing mechanism, corresponding substantially to the offset line 1—1 of Figure 2 and showing the same in applied position in the draft gear pocket of a draft rigging. Figure 2 is a transverse vertical sectional view, corresponding substantially to the line 2—2 of Figure 1. Figure 3 is a longitudinal, vertical sectional view, corresponding substantially to the line 3—3 of Figure 2. Figure 4 is a view, similar to Figure 1, showing the mechanism partly compressed in buff.

My improved shock absorbing mechanism, as

2 illustrated in the drawings, comprises broadly a spring cage A, a friction casing B, three friction shoes C—C—C, a wedge block D, a spring resistance E within the friction casing, an inner follower F, and additional spring resistance means G—G within the cage opposing relative movement of the cage and follower.

As shown in the drawings, the improved shock absorbing mechanism is contained in the draft gear pocket of the underframe structure of a railway locomotive or car. This underframe structure is of well-known design, comprising center sills 10—10 provided with outer and inner stop lugs 11—11 and 12—12. The shock absorbing mechanism is supported in the usual yoke 13, which is connected to the drawbar or coupler of the locomotive or car.

The spring cage A is in the form of a rectangular boxlike member, open at its inner end and having spaced horizontally disposed top and bottom walls 14 and 15, spaced vertical side walls 16—16, and a transverse wall 17 at its outer end. The wall 17 presents substantially vertically disposed abutment faces 18—18 on the outer side at opposite sides thereof adapted to cooperate with the outer stop lugs 11—11, and a rounded surface 19 therebetween which cooperates with the inner side of the outer end of the yoke 13, which is correspondingly rounded, to swivel thereon.

The friction casing B is formed integral with the cage A and projects from the wall 17 thereof, being disposed centrally between the side walls 16—16 of the cage. The casing B is of hexagonal, transverse cross section, two of the opposed parallel side walls thereof being formed by the central portions of the top and bottom walls 14 and 15 of the spring cage A, and the remaining four walls being formed by a pair of connecting webs 20—20 extending from the wall 14 to the wall 15 and formed integral therewith and with the wall 17 of the cage. The webs 20—20 are of V-shaped, transverse section, each web forming two diverging walls of the hexagonal casing B. The webs 20—20 also divide the spring cage A into sections, the sections at opposite sides of the casing B forming spring pockets 21—21. At the open end thereof, the casing B is provided with three interior, inwardly converging friction surfaces 22—22—22 of V-shaped, transverse section, each surface being formed by two diverging adjacent walls of the hexagonal casing. As shown in Figure 1, the open end of the casing B is flush with the open end of the spring cage A.

The friction shoes C are three in number and are slidingly telescoped within the open end of the casing B. Each shoe has a friction surface 23 of V-shaped, transverse section on its outer side engaging with one of the V-shaped surfaces 22 of the casing B. Each shoe also is laterally inwardly enlarged at the outer end portion thereof and said enlarged portion presents a wedge face 24 and a transverse shoulder 25 at the inner end of said face. The wedge face 24 is of V-shaped, transverse cross section and the wedge faces of the three shoes converge inwardly of the casing B.

The wedge D is in the form of a hollow block of hexagonal, transverse, exterior cross section and presents three exterior wedge faces 26—26—26 at the right hand end thereof, as seen in Figure 1, engaging the wedge faces 24—24—24 of the shoes. At the left hand end, the wedge block D is enlarged, as indicated at 27, thus providing a transverse peripheral shoulder 28. The end face 29 of the enlarged portion of the wedge block is curved and bears on the transverse inner end member of the yoke, which is correspondingly rounded to swivel thereon.

The spring resistance E is disposed within the casing B and comprises inner and outer coils bearing at opposite ends, respectively, on the wall 17 of the cage A and a spring follower disc 30 bearing on the shoulders 25—25—25 of the shoes C—C—C.

The parts of the friction shock absorber are held assembled by a retainer bolt 31, which is anchored to the wall 17 of the cage A and extends into the wedge D and has shouldered engagement with the latter to restrict outward movement thereof.

The follower F is in the form of a relatively heavy, rectangular plate having a central opening 32 therethrough to accommodate the wedge block D. The opening 32 is contracted at its right hand end, as seen in Figures 1, 3, and 4, to provide a continuous shoulder 33, which engages with the shoulder 28 of the wedge block to limit movement of the follower to the right with respect to the wedge block. The follower F overlaps the top, bottom, and opposite side walls of the spring cage A and is provided with right angular, peripheral flanges 34—34, which are engageable with the cage to limit movement of the follower and the wedge block inwardly toward the cage. At its outer side, the follower F presents substantially flat, vertically disposed abutment faces 35—35 at opposite ends thereof, which cooperate with the inner stop lugs 12—12. The surface of the follower between the faces 35—35 is rounded to fit the corresponding rounded end member of the yoke 13.

The spring means G, which is disposed at opposite sides of the casing B in the pockets 21—21 of the spring cage A, comprises four coils, two at each side of the casing B, these coils being arranged at the top and bottom corners of the cage A. The four coils of the spring means G have their opposite ends bearing, respectively, on the follower F and the wall 17 of the cage A, and yieldingly resist relative approach of the follower and cage.

In the normal full release position of the mechanism, as shown in Figure 1, the retainer bolt 31 holds the wedge block D in shouldered engagement with the follower F and the wedge block D holds the shoes with their outer ends slightly spaced from the follower F. When a draft or pulling action is applied to the yoke 13, the same is moved to the right, as viewed in Figures 1 and 3, thereby forcing the follower F and the wedge block D to the right and compressing the mechanism against the outer stop lugs 11—11. During this action, the springs G are compressed between the follower F and the wall 17 of the spring cage, and the wedge D moves inwardly of the friction casing B, wedging the shoes apart and also forcing the same to slide inwardly of the casing against the resistance of the spring means E. High frictional resistance is thus produced in addition to the resistance provided by the spring means G. Compression of the mechanism continues until inward movement of the follower F and the wedge block D is limited by engagement of the follower with the open end of the cage A, thereby preventing overcompression of the springs. When the actuating force is reduced, the springs return all of the parts to the normal full release position shown in Figures 1 and 3.

When a buff or pushing force is applied to the yoke 13, the same is moved to the left, as seen in Figures 1 and 3, thereby forcing the cage A to the left toward the follower F and compressing the mechanism against the inner stop lugs 12—12. Inasmuch as the wedge block D is free to move to the left in unison with the yoke, with respect to the follower F, which is held stationary by the stop lugs 12—12, the spring means G only is compressed during the first part of the buffing stroke. As the cage A continues to move toward the follower F, carrying the friction casing B, shoes C—C—C, and wedge block D therewith, the shoes C—C—C approach and finally engage the follower F. During the remainder of the compression stroke in buff, the shoes are held stationary by engagement with the follower F and the spring means E of the friction shock absorber is compressed against the shoes in unison with the spring means G, which is being compressed directly against the follower. Thus, only free spring action is had in buff, the spring means G being compressed during the entire stroke while the compression of the spring means E is delayed until after the shoes engage the follower F. Graduated spring resistance is thus provided, the resistance of the spring means G being augmented by that of the spring means E after the mechanism has been compressed to a predetermined extent in buff. Compression in buff is finally limited by engagement of the open end of the cage A with the follower F, thus preventing overcompression of the springs.

I claim:

1. In a shock absorbing mechanism for railway draft riggings having inner and outer stops and a lengthwise movable yoke, the combination with a follower; of a spring cage, said follower and cage being enclosed within the yoke, said follower and cage being relatively movable toward and away from each other lengthwise of the mechanism; spring means within the cage opposing relative movement toward each other of the follower and cage; a friction casing movable in unison with said cage; friction shoes slidingly telescoped within the casing; spring means within the casing yieldingly opposing movement of the shoes inwardly of the casing; a block in wedging engagement with the shoes, said block being movable with respect to said follower in direction lengthwise of the mechanism, said yoke, when moved lengthwise in one direction, engaging the follower and block to move the same toward the cage and friction casing to compress said first named spring means and force the shoes inwardly of the casing against the resistance of said second named spring means, said yoke, when moved in a reverse direction, engaging and moving the spring cage and casing toward said follower to compress said first and second named spring means against said follower and shoes, respectively, said shoes engaging the follower and being held against relative movement with respect to the same during this action.

2. In a shock absorber, the combination with a spring cage; of a follower, said follower and spring cage being movable relatively toward and away from each other lengthwise of the mechanism; a friction casing movable in unison with said cage; friction shoes slidingly telescoped within the casing; a block having wedging engagement with the shoes, said block being movable lengthwise of the mechanism with respect to said follower; spring means yieldingly opposing relative movement of the follower and cage toward each other; and spring means within the casing yieldingly opposing movement of the shoes inwardly of the casing, said block being inwardly movable with the follower when the follower is moved toward the cage to force said shoes inwardly of the casing against the resistance of said second named spring means, said shoes being moved toward said follower in unison with the casing when the cage is moved toward the follower, said shoes having their movement toward the follower arrested by engagement with said follower after a predetermined movement of the cage toward said follower to effect compression of said second named spring means against the shoes.

3. In a shock absorber, the combination with a spring cage; of a friction shell rigid with said cage; a follower, said follower and cage being movable toward and away from each other lengthwise of the mechanism; friction shoes slidingly telescoped within the shell; a wedge block having wedging engagement with the shoes, said wedge block being movable lengthwise of the mechanism with respect to said follower; spring means within the spring cage yieldingly opposing relative movement toward each other of the follower and cage; spring means within the shell yieldingly resisting inward movement of the shoes; and a lengthwise movable yoke having engagement at one end with the follower and wedge block to move the same toward the cage and hold the wedge block pressed against the shoes with the shoes spaced from said follower, said yoke having engagement at its other end with the spring cage to move the same toward said follower to compress said first named spring means, and move said shell and shoes toward said follower to engage the shoes therewith and effect compression of said second named spring means.

4. In a shock absorber, the combination with a follower; of a spring cage, said follower and spring cage being relatively movable toward and away from each other lengthwise of the mechanism; a lengthwise movable yoke having an inwardly facing abutment at one end thereof engaging said follower, and an inwardly facing abutment at the other end engaging said cage; a wedge member movable lengthwise of the mechanism with respect to the follower, said wedge member bearing on said first named abutment of the yoke; a friction casing rigid with said cage; friction shoes slidingly telescoped within the cage and in wedging engagement with said wedge member, said wedge member holding the shoes spaced from said follower a predetermined distance less than the full compression stroke of the mechanism in the full release position of said mechanism, said shoes being engageable with the follower after the mechanism has been compressed to said predetermined extent by movement of said cage toward said follower; spring means within the cage yieldingly resisting relative approach of said follower and cage; and spring means within the casing yieldingly opposing movement of the shoes inwardly of the casing.

5. In a shock absorber for a railway draft rigging having inner and outer stop lugs, the combination with a lengthwise movable yoke; of a follower engageable with said inner stop lugs; a spring cage engageable with said outer stop lugs, said follower and cage being relatively movable toward each other, said follower and cage being disposed within the yoke, said yoke having engagement at one end thereof with said follower to move the same toward said cage when said yoke is moved lengthwise in one direction, said yoke having engagement at the other end thereof with the cage to move the same toward said follower when the yoke is moved in a reverse direction; a friction casing fixed with respect to the cage and movable in unison therewith; a wedge block engaged by said first named end of the yoke to be moved toward the spring cage in unison with said follower, said wedge block being movable lengthwise with respect to said follower away from said cage; friction shoes slidingly telescoped within the casing and in wedging engagement with said wedge block, said wedge block in full release of the mechanism holding the shoes spaced from said follower a predetermined distance less than the full compression stroke of the mechanism; spring means yieldingly opposing movement of the follower and cage toward each other; and additional spring means within the casing yieldingly opposing inward movement of the shoes, said shoes being engageable with the follower after the mechanism has been compressed to said predetermined extent by movement of the cage toward said follower, to effect compression of said additional spring means during the remainder of the compression stroke.

6. In a shock absorbing mechanism, the combination with a follower having an opening therethrough; of a wedge block movable lengthwise in said opening; shoulders on said block and follower arresting inward movement of said wedge block with respect to the follower with the outer end of the wedge block flush with the outer side of said follower; a spring cage, said spring cage and follower being relatively movable toward and away from each other; a friction casing fixed with respect to said cage and movable in unison therewith; friction shoes slidingly telescoped within the casing and having wedging engagement with said block, said block, when in said arrested position with respect to the follower, holding the shoes spaced from the follower a predetermined distance less than the full compression stroke of the mechanism, said shoes being movable into engagement with the follower by movement of the cage toward said follower; springs yieldingly opposing relative movement of the follower and cage toward each other; and additional springs yieldingly opposing movement of said shoes inwardly of the casing.

7. In a shock absorbing mechanism, the combination with a follower having an opening therethrough; of a wedge block movable lengthwise in said opening; shoulders on said block and follower arresting inward movement of said wedge block with respect to the follower with the outer end of the wedge block flush with the outer side of said follower; a spring cage, said spring cage and follower being relatively movable toward and away from each other; a friction casing fixed with respect to said cage and movable in unison therewith; friction shoes slidingly telescoped within the casing and having wedging engagement with said block, said block, when in said arrested position with respect to the follower, holding the shoes spaced from the follower a predetermined distance less than the full compression stroke of the mechanism, said shoes being movable into engagement with the follower by movement of the cage toward said follower; springs yieldingly opposing relative movement of the follower and cage toward each other; additional springs yieldingly opposing movement of said shoes inwardly of the casing; and a retainer bolt limiting outward movement of the wedge block with respect to the spring cage and friction casing.

8. In a shock absorbing mechanism, the combination with a spring cage; of a follower, said follower and cage being relatively movable with respect to each other lengthwise of the mechanism; a friction casing fixed with respect to the cage and movable in unison therewith; friction shoes slidingly telescoped within the casing; a spring within the casing resisting inward movement of the shoes; a second spring within the spring cage yieldingly opposing relative approach of the follower and spring cage; a wedge block extending through said follower and movable in lengthwise direction with respect to said follower; a stop shoulder on said follower with which the wedge block is engageable to limit relative approach of the wedge block and friction casing, said wedge block having wedge faces engaging said shoes; and a retainer bolt limiting movement of the wedge block away from said friction casing and spring cage, said bolt, in the normal full release position of the mechanism, holding the wedge block in said shouldered engagement with the follower, and said wedge block holding the outer end of the shoes spaced from said follower a predetermined distance less than the full compression stroke of the mechanism to allow the shoes to move toward said follower and engage the latter to arrest movement of said shoes after the mechanism has been compressed to said predetermined extent during movement of the casing toward said follower, thereby effecting compression of said first named spring.

9. In a shock absorbing mechanism, the combination with a friction casing having interior friction surfaces; of friction shoes slidingly engaged with the friction surfaces of the casing; a wedge member having wedge faces engaging said shoes; a follower through which said wedge member extends and with respect to which it is movable in direction lengthwise of the mechanism; a spring cage to which the friction casing is fixed and with which it is movable in unison, said follower and cage being relatively movable with respect to each other lengthwise of the mechanism; spring means within the casing yieldingly opposing movement of the shoes inwardly thereof; and additional spring means in the spring cage yieldingly opposing movement of said follower and cage toward each other.

GEORGE E. DATH.

No references cited.